US009498781B2

(12) United States Patent
Echelmeyer et al.

(10) Patent No.: US 9,498,781 B2
(45) Date of Patent: Nov. 22, 2016

(54) METHOD FOR MANUFACTURING LARGE MILL CYLINDERS

(71) Applicant: ThyssenKrupp Industrial Solutions AG, Essen (DE)

(72) Inventors: Andreas Echelmeyer, Oelde (DE); Norbert Patzelt, Beckum (DE); Bernd Kripzak, Oelde (DE); Herbert Pingel, Wadersloh (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/425,202

(22) PCT Filed: Jul. 26, 2013

(86) PCT No.: PCT/EP2013/065802
§ 371 (c)(1),
(2) Date: Mar. 2, 2015

(87) PCT Pub. No.: WO2014/032877
PCT Pub. Date: Mar. 6, 2014

(65) Prior Publication Data
US 2015/0352557 A1 Dec. 10, 2015

(30) Foreign Application Priority Data
Sep. 3, 2012 (DE) .................. 10 2012 108 163

(51) Int. Cl.
B23K 37/04 (2006.01)
B23K 5/08 (2006.01)
(Continued)

(52) U.S. Cl.
CPC ............... B02C 17/18 (2013.01); B02C 17/00 (2013.01); B23K 9/235 (2013.01); B23K 31/02 (2013.01);

(58) Field of Classification Search
CPC .......... B23K 37/0531; B23K 2201/06; B23K 2201/12; B23K 37/00; B23K 37/02; B23K 37/0276; B23K 9/235; B23K 20/126; B23K 20/129; B23K 2201/04
USPC .................. 228/44.5, 49.3, 212, 213, 25, 29
See application file for complete search history.

(56) References Cited

U.S. PATENT DOCUMENTS 1,568,905 A * 1/1926 Munro ...................... B21D 5/14
72/171
3,115,859 A * 12/1963 Haussler ............ B23K 37/0531
228/44.5
3,259,964 A * 7/1966 Engel ................. B23K 37/0531
219/60 R
(Continued)

FOREIGN PATENT DOCUMENTS

DE 1281810 B 10/1968
DE 1932176 A1 1/1971
DE 8913313 U1 12/1989

OTHER PUBLICATIONS

PCT Patent Application PCT/EP2013/065802 International Search Report and Written Opinion dated Jan. 31, 2014, 4 pages.

Primary Examiner — Erin Saad
(74) Attorney, Agent, or Firm — Lathrop & Gage LLP

(57) ABSTRACT

A plurality of cylinder sections are welded together to form a milling cylinder, wherein, prior to welding, individual cylinder sections are machined in the region of their end edges to be welded, using at least one machining tool. Furthermore, the cylinder section to be machined is provided with inwardly oriented bracing means, wherein a temporary axle is fitted on the bracing means such that the temporary axle is oriented in the mid-axis of the cylinder section, and wherein the at least one machining tool is fastened to the temporary axle by means of a holder and the machining tool is rotated relative to the cylinder section about or with the temporary axle during the machining of the end edges.

18 Claims, 7 Drawing Sheets

(51) Int. Cl.
  *B02C 17/18* (2006.01)
  *B23K 31/02* (2006.01)
  *B23K 37/053* (2006.01)
  *B23K 9/235* (2006.01)
  *B23K 37/00* (2006.01)
  *B23K 37/02* (2006.01)
  *B02C 17/00* (2006.01)

(56) References Cited

U.S. PATENT DOCUMENTS

| | | | |
|---|---|---|---|
| 3,461,264 A * | 8/1969 | Sims | B23K 9/0284 219/160 |
| 3,561,320 A | 2/1971 | Nelson et al. | |
| 3,613,320 A * | 10/1971 | Mighton | B23B 5/16 451/51 |
| 3,979,041 A * | 9/1976 | Kaneyama | B23K 37/0531 228/212 |
| 4,625,601 A * | 12/1986 | Brummet | B23B 5/162 144/205 |
| 4,717,131 A * | 1/1988 | Dugas | B23K 37/0435 267/41 |
| 6,007,410 A * | 12/1999 | Nerenberg | B24B 5/40 29/282 |
| 2003/0047650 A1* | 3/2003 | Schnorrer | B23K 37/0531 248/62 |

* cited by examiner

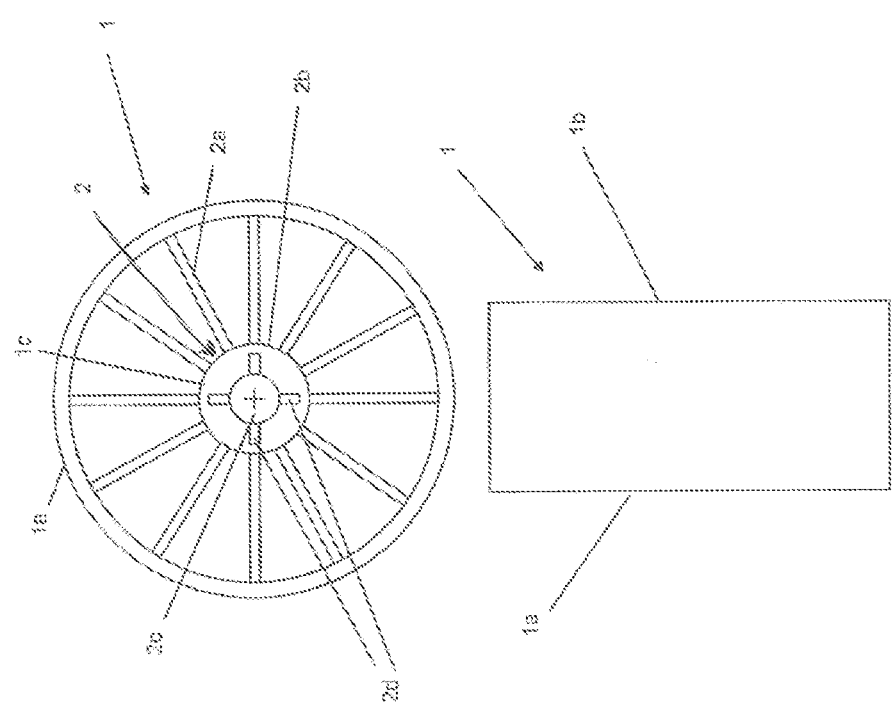

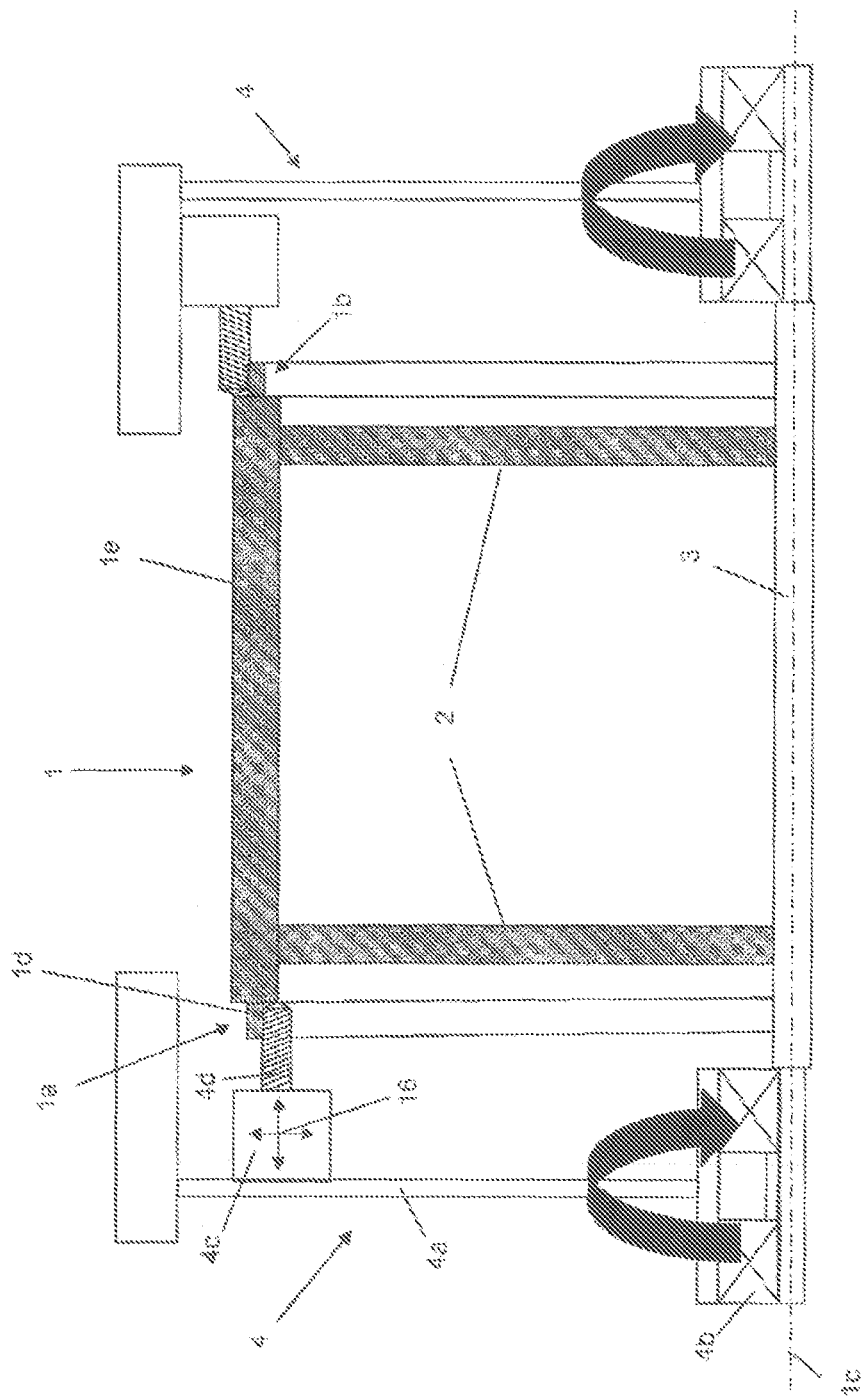

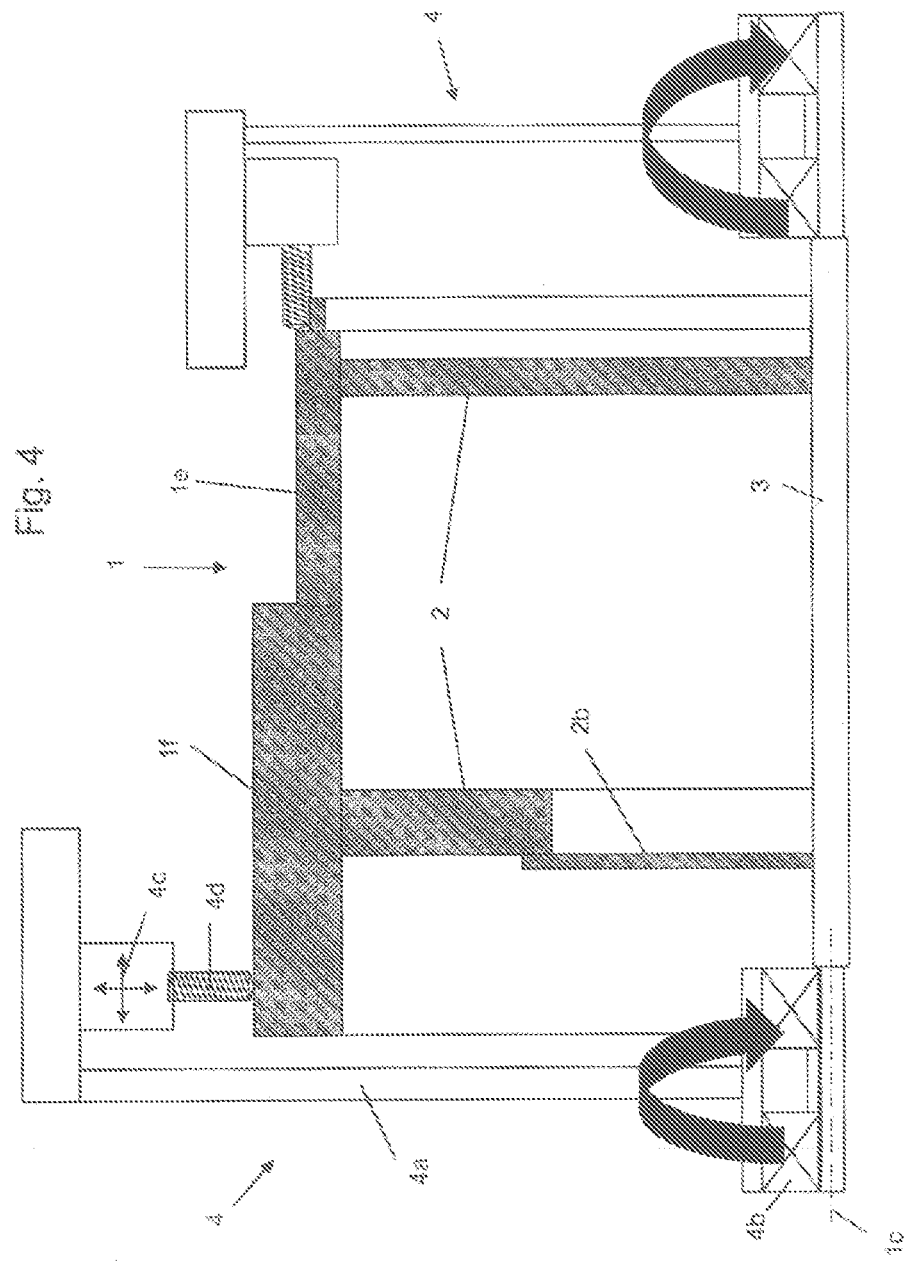

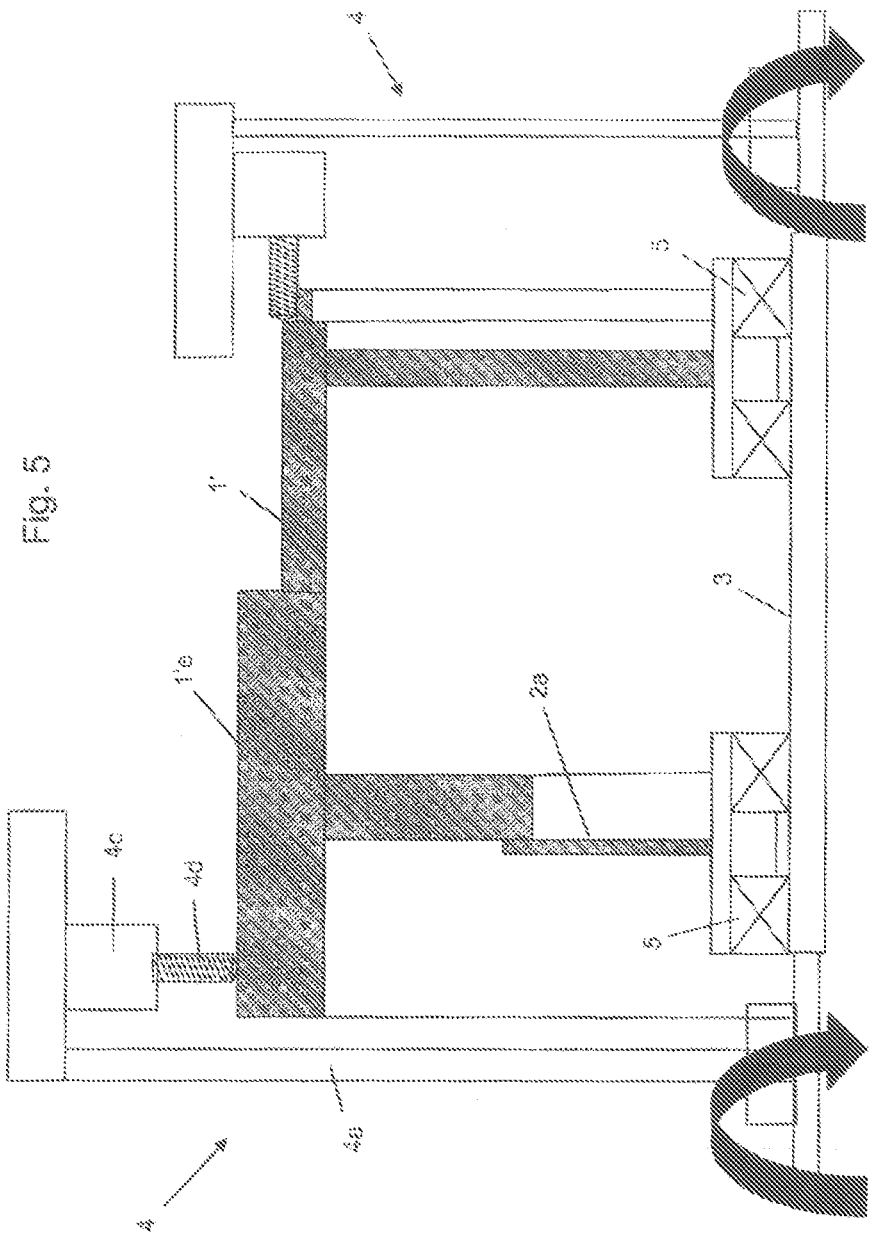

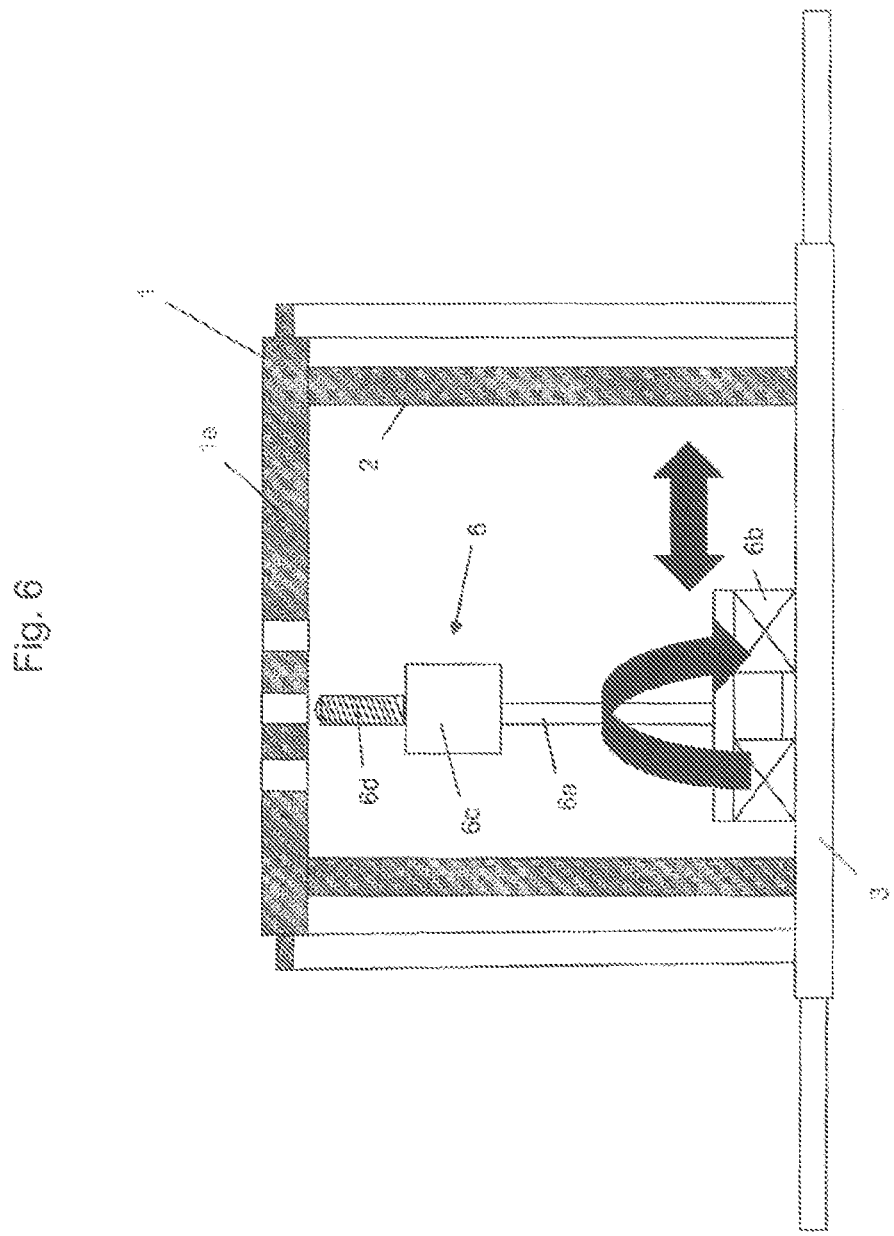

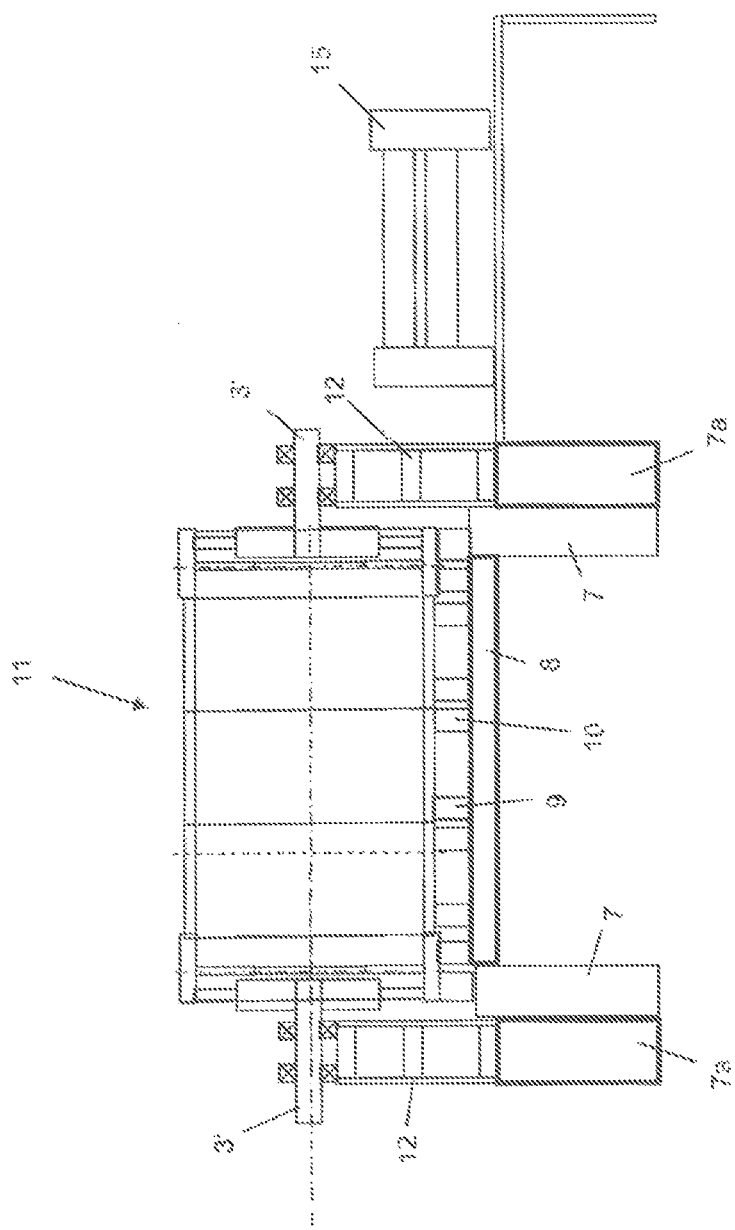

METHOD FOR MANUFACTURING LARGE MILL CYLINDERS

CROSS-REFERENCE TO RELATED APPLICATIONS

This Application is the U.S. national phase application of International Application No. PCT/EP2013/065802 filed Jul. 26, 2013, which claims priority to German Patent Application No. DE 102012108163.8 filed Sep. 3, 2012. Each of these applications is incorporated herein by reference in its entirety.

BACKGROUND OF THE INVENTION

Field of the Invention

The invention relates generally to the field of manufacturing large mill cylinders. More specifically, the invention relates to a method for manufacturing large mill cylinders, wherein the mill cylinder is composed of a plurality of cylinder sections which are welded to one another.

Description of the Related Art

Mill cylinders comprising a plurality of cylindrical sections welded to one another may display diameters of 3 to 12 m and more and are employed for ball mills, autogenous mills, and semi-autogenous mills, for example. These mills typically are circumferentially mounted, wherein raceways which interact with correspondingly configured friction bearings are provided on the end regions of the mill cylinder, as shown for example in German Patent Application No. DE 89 13 313 U1. It is of decisive significance in the case of this type of mounting that the individual cylinder sections are exactly aligned in relation to the common mill axis and also the end edges to be welded to one another are aligned so as to be concentric and orthogonal in relation to the raceway face.

On account of the large dimensions, the complete mill cylinder cannot be shipped any more. Therefore, it is typical that the individual cylinder sections are shipped to the construction site having end edges which are prepared for welding and are welded to one another only on site. To this end, the applicant has developed what is referred to as the Polweld® method.

Since ever larger mill cylinders have been built in recent times, shipping of the individual cylinder sections to the construction site is also associated with enormous costs. Here, not only the shipping costs but also any applicable import duties on semi-finished products have to be taken into account. Therefore, it has been proposed in DE 89 13 313 U1 to divide the mill cylinders and the raceways in the longitudinal direction and to interconnect the component parts using flanges.

German Patent Application No. DE 12 81 810 A1 discloses a centering device for large cylinder sections to be welded to one another, in particular in the case of tube mills.

SUMMARY

The invention is based on the object of providing a method for manufacturing large mill cylinders which are composed of a plurality of cylinder sections, which method is distinguished from the prior art by virtue of the lower manufacturing costs, for example.

In a method according to an exemplary embodiment of the invention, a plurality of cylinder sections are welded to one another, wherein prior to welding at least individual cylinder sections, in the region of their end edges to be welded, are machined using at least one machining tool. Moreover, the cylinder portion to be machined is provided with inwardly aligned reinforcements, wherein a temporary axle is attached to the reinforcements in such a manner that the temporary axle is aligned in the central axis of the cylinder section, and wherein the at least one machining tool is fastened to the temporary axle by means of a mount, and rotation of the machining tool in relation to the cylinder section about or together with the temporary axle takes place during machining of the end edges, and the temporary axle is dismantled and removed post machining of the end edges.

Another aspect of the invention, according to an embodiment, relates to machining of the raceways of the mill cylinder, wherein on two of the cylinder sections which are welded to one another, on their circumferential face, in each case one raceway is provided for mounting the mill cylinder. Here too, the mill cylinder which is composed of the cylinder sections, which are welded to one another is provided with inwardly aligned reinforcements, wherein at least one temporary axle is attached to the reinforcements in such a manner that the temporary axle is aligned in the central axis of the mill cylinder. In turn, the machining tool is fastened to the temporary axle by means of a mount, such that rotation of the machining tool in relation to the mill cylinder about or together with the temporary axle takes place during machining of the raceways using the machining tool, and the at least one temporary axle is dismantled and removed post machining of the raceways.

A temporary axle can be fastened to the reinforcements and aligned in the central axis of the cylinder section, or the mill cylinder, respectively, in a comparatively simply manner. A mount element which is fastened to this temporary axle enables machining of the end edges of the individual cylinder sections, or of the raceways provided on the circumferential face of the mill cylinder, respectively, in a manner which is concentrically and orthogonally aligned in relation to said axle. It is also ensured in this way that concentric raceways or raceway surfaces, respectively, are created.

A grinding tool and/or a milling tool and/or a turning tool and/or a boring tool may be employed in particular as a machining tool. The mount of the machining tool preferably is aligned such that machining of the end edges of the cylinder sections takes place in a concentric and orthogonal manner in relation to the temporary axle. Machining of the raceways of the mill cylinder also takes place in a concentric manner in relation to the temporary axle.

According to another embodiment of the invention, the cylinder sections are manufactured from rolled sheet material, wherein this is preferably carried out at the construction site. Moreover, the sheet material required therefor can be shipped significantly more cost effectively than prefabricated cylinder sections.

It is furthermore expedient for the individual machined cylinder sections to be welded to one another at the future operating site of the mill cylinder. This has the advantage that the construction of additional, expensive foundations for the mounting during welding can be dispensed with. It is, therefore, also expedient for machining of the raceways to take place at the future operating site of the mill cylinder, using mill foundations which are provided there for the future mounting of the mill cylinder, wherein the at least one temporary axle is mounted in temporary bearings and the temporary bearings are directly or indirectly supported on the mill foundations which are provided for the future mounting.

The reinforcements are dismantled and disposed of during the final commissioning of the mill/mill cylinder.

BRIEF DESCRIPTION OF THE SEVERAL VIEWS OF THE DRAWINGS

Illustrative embodiments of the present invention are described in detail below with reference to the attached drawing figures and wherein:

FIG. 1 shows a front view of a cylinder section having reinforcements;

FIG. 2 shows a side view of the cylinder section of FIG. 1;

FIG. 3 shows a schematic illustration of machining the end edges of a cylinder section, using a machine tool rotating about the temporary axle;

FIG. 4 shows a schematic illustration of machining the end edge and the raceway of a cylinder section, using a machine tool rotating about the temporary axle;

FIG. 5 shows a schematic illustration of machining the end edge and the raceway of a cylinder section, using a machine tool rotating together with the temporary axle;

FIG. 6 shows a schematic illustration of the cylinder section when applying borings in the cylinder sleeve, using a boring tool rotating about the temporary axle;

FIG. 8 shows a schematic illustration of the mill cylinder mounted in temporary bearings, having a mill unit.

DETAILED DESCRIPTION

Figure 7:
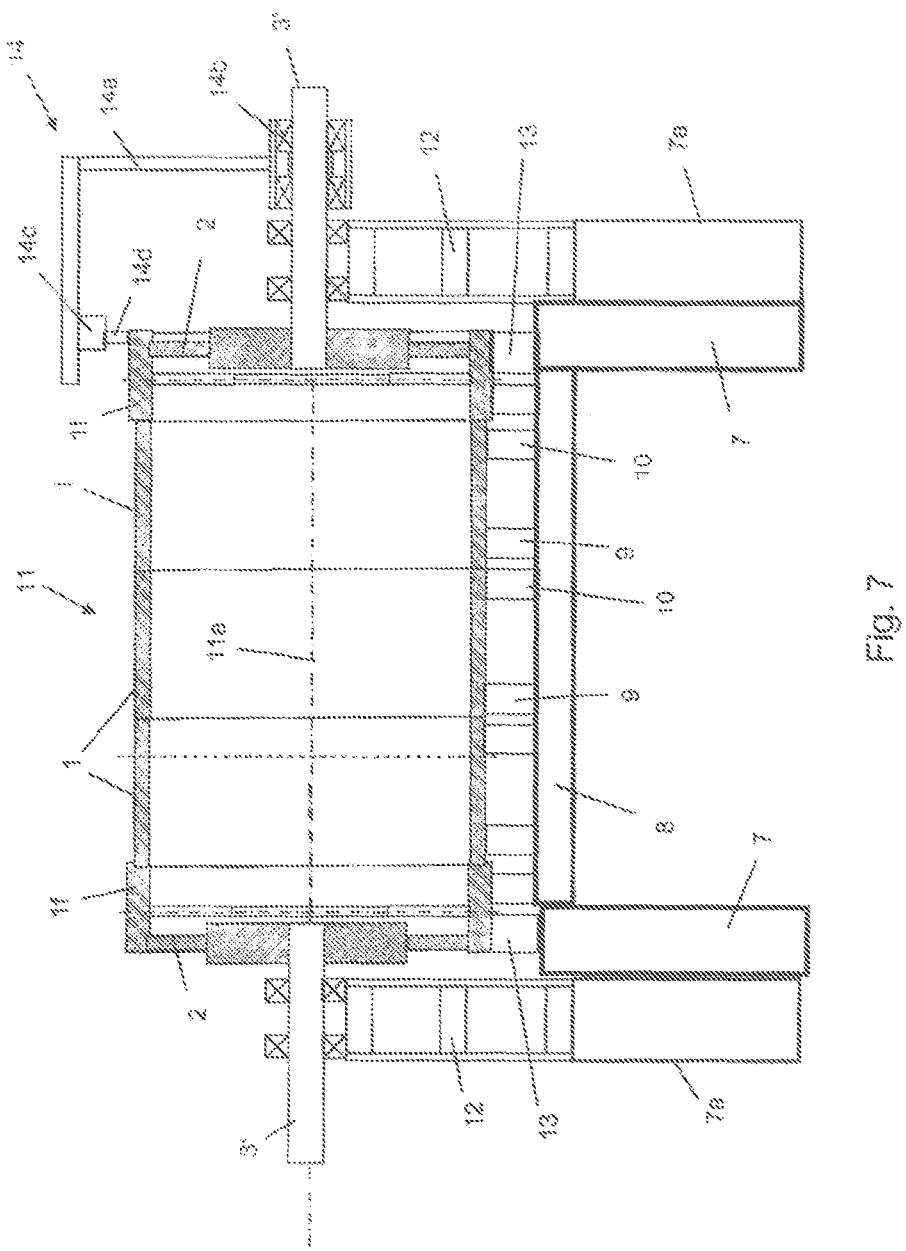
FIG. 7 shows a schematic illustration during machining of the raceways of a mill cylinder.

The cylinder section which is illustrated in FIGS. 1 and 2 is manufactured from rolled sheet material and displays a wall thickness in the range of 30 mm to 220 mm, and an outer diameter of 3 m to 14 m, for example. The length of the cylinder section 1 typically is in the range of 1.5 m to 6 m.

The cylinder section is provided with inwardly aligned reinforcements 2 which is in each case arranged in proximity of the end edges 1a, 1b. These reinforcements in each case are composed of a central disk 2b and a multiplicity of radial stays 2a, the radial stays 2a being welded to the inner side of the cylinder section 1.

In order to now be able to weld a plurality of these cylinder sections to one another to form a mill cylinder, the end edges 1a, 1b have to be machined using a machining tool (FIG. 3). To this end, a temporary axle 3 is inserted through the cylinder section 1 and attached in such a manner in the region of the reinforcements 2 that the temporary axle is exactly aligned in the central axis of the cylinder section. To this end, the central disk 2b of the reinforcement 2 is provided with a central opening 2c which in diameter is somewhat larger than the diameter of the temporary axle 3. Readjustment means 2d, by way of which the temporary axle can be fastened to the reinforcement 2 and exactly aligned in the central axis of the cylinder section, are provide in the region of the opening 2c (FIG. 1). These readjustment means may be formed by readjustment screws, for example, or any type of clamping, such as clamping screws, setting screws, readjustment wedges, cams. FIG. 3 shows the situation with the aligned temporary axle 3. The cylinder section expediently is mounted in the region of its circumferential face 1e in suitable bearing shoes.

As can be identified from FIG. 3, on the two ends of the temporary axle 3 which project out of the cylinder section 1, there is in each case a machining tool 4 having a mount 4a which is mounted on the fixed temporary axle 3 by way of a bearing 4b. Furthermore, a displacement mechanism 4c which carries the actual tool 4d and enables displacement of the tool 4d in the direction of and perpendicularly to the temporary axle 3 (arrows 16), and is thus adjustable in the direction of and perpendicularly to the central axis 1c of the cylinder section 1, is provided on the mount 4a. A turning tool or a milling tool, for example, is employed as a tool 4d for machining the end edges 1a, 1b.

The end edges 1a and 1b are turned or milled from the inside and the outside, such that a central web 1d is created. The outer end face of this web 1d here lies exactly in a plane which is perpendicularly aligned to the central axis 1c.

During later welding of a plurality of cylinder sections, the webs of adjacent cylinder sections directly abut one another and in this way can be exactly aligned and welded in that the material previously removed by the machining tool is filled in again with welding material.

FIG. 4 shows machining of a cylinder section 1 which on its outer side is provided with a raceway 1f. The raceway is formed by a region of the cylinder sleeve 1e, which displays a greater wall thickness. In order to ensure later smooth revolving of the mill cylinder, the running surface of the raceway 1f has to be aligned so as to be absolutely parallel with the central axis 1c of the cylinder section 1. This may also take place by way of the machining tool 4. The mount 4a and the displacement mechanism 4c here are configured such that the complete raceway 1f can be machined.

Instead of a fixedly disposed temporary axle 3 about which the machining tool 4 rotates, it may also be provided that the temporary axle 3 is rotatably mounted in the region of the reinforcements 2 and the machining tool is connected to the temporary axle 3 in a rotationally fixed manner (FIG. 5). For this purpose, the temporary axle would have to be mounted on the reinforcements 2 with the aid of bearings 5, in particular in the region of the central disk 2a.

In both variants of the embodiment the mount 4a and, in particular, the connection to the temporary axle 3, are to be configured such that the tool 4d which comes into machining contact with the cylinder section is guided so as to be exactly in a plane which is perpendicular to the temporary axle 3.

Using the concept of a machining tool with rotates together with or about a temporary axle, is it also possible for borings which are aligned in an exactly radial manner to be incorporated in the cylinder sleeve 1e of the cylinder section 1 (see FIG. 6). To this end, a machining tool 6 is mounted in the interior of the cylinder section 1 by means of a bearing 6b on the temporary axle 3. The mount 6a, in turn, carries a displacement mechanism 6c and a drill 6d which is aligned in an exactly radial manner. Displacement of the machining tool in the direction of the temporary axle 3 expediently takes place in the region of the bearing 6b by way of a suitable mechanism which is not illustrated in more detail here.

According to a preferred exemplary embodiment, welding of the prepared cylinder sections at the future operating site of the mill cylinder takes place using mill foundations 7 which are provided there for the future mounting of the mill cylinder. To this end, a temporary support structure 8 having support bearings 9, 10, or seats, respectively, which are provided for each cylinder portion, is disposed between the mill foundations 7. The support bearings 9, 10 are adjustable for height and thus enable exact alignment of the cylinder sections 1 which are to be welded to one another and which during welding touch one another by way of their webs 1d.

The welded mill cylinder 11, on both its ends, displays the cylinder sections 1 which are provided with the raceways if and which, in turn, are provided with reinforcements 2 which mount the temporary axles 3' which, in turn, are aligned to the mill-cylinder axle 11a of the mill cylinder. In this exemplary embodiment the temporary axles 1' are configured as axle stubs. However, a continuous axle would also be conceivable. The temporary axles 3', in turn, are mounted in temporary bearings 12 which are directly or indirectly supported on the mill foundations 7 which are provided for the future mounting. In the illustrated exemplary embodiment, supports 7a for carrying the temporary bearings 12 are attached to the foundations 7.

During machining according to FIGS. 4 and 5, the raceway if expediently are only pre-machined, such that the final manufacturing of the running surface takes place after welding of the cylinder sections, wherein the mill cylinder is mounted by way of the temporary axles 3' and the running surface thus does not yet come in contact with the future friction-shoe bearings 13. In turn, a machining tool 14 which again comprises a mount 14a, a bearing 14b, a displacement mechanism 14c, and a tool 14d, is provided for final machining of the raceways 1f. The machining tool 14 is disposed with the bearing 14 on the temporary shaft 3', such that said machining tool 14 can rotate together with or about the temporary axle and here comes into machining contact with the raceway 1f. A grinding tool may be applied here as the tool 14b, for example.

After completion of the raceways 1'e, the mill cylinder 11 is lowered, so as to establish contact between the raceways 1'e and the friction-shoe bearings 13. The temporary axles 3' and the reinforcements are dismantled and removed. Here, the temporary axles 3' not only enable rotation of the machining tool 14 but also serve for rotation of the mill cylinder 11, such that all regions of the raceway 1'e can be approached and machined by the machining tool 14.

The exemplary embodiment according to FIG. 8 additionally provides a sheet-metal roller 15 which is screwed to the foundation 7, or to the supports 7a thereof, respectively. Using this sheet-metal roller 15, the individual cylinder sections 1 are manufactured. By way of a suitable displacement mechanism the individual cylinder portions then can be displaced toward the left onto the support structure 8 for machining. The support structure 8, having its support bearings 9, 10, is also suitable for mounting the cylinder sections for machining the end edges thereof, according to FIGS. 3 to 6. This means that the individual cylinder sections 1 are held by the support bearings 9, 10 via the cylinder sleeves of said cylinder sections 1, and the temporary axles 3 merely serve for mounting the machining tools 4. As soon as all cylinder portions have been prepared for the welding operation, they may be welded together there and then. To this end, in particular the Polweld® method of the applicant, which is known in practice, is applied.

The application of the Polweld® method requires a very exacting preparation of the weld seam, in that the front edges of the webs 1d of the cylinder portions 1 lie exactly in one plane which is aligned so as to be perpendicular to the central axis of the cylinder portion. This preparation of the weld seam may reliably take place using the machining tool 4 which is rotatable about or together with the temporary axle 3. In this way it is possible for only the flat sheet metal plates, or the sheet material, respectively, to be shipped to the construction site and for the cylinders to be able to be rolled and correspondingly machined on site. On account thereof, the shipping costs and also the import duties can be significantly reduced.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

The invention claimed is:

1. A method of manufacturing a mill cylinder, the mill cylinder comprising a plurality of cylindrical sections, the method comprising steps:
    providing a first cylindrical section and a second cylindrical section, the second cylindrical section having inside and outside diameters substantially equal to inside and outside diameters of the first cylindrical section, the first cylindrical section comprising:
        a circumferential surface, an end edge, and a reinforcing member; the reinforcing member including a central disk having an opening; a plurality of radial stays extending from the central disk to the circumferential surface;
    temporarily situating the first cylindrical section on an axle that passes through the opening;
    operably coupling a machining tool to the axle;
    causing the machining tool to rotate such that the machining tool machines an inside face and an outside face of the end edge to form a first web;
    abutting the first web with a second web of the second cylindrical section, the first and second webs having a uniform shape where abutting one another;
    welding the first web to the second web by placing welding material in an interior channel formed by the first and second abutting webs and in an exterior channel formed by the first and second abutting webs; and
    dismantling the reinforcing member.

2. The method of claim 1 wherein the axle is fixedly disposed and the machining tool is configured to rotate relative to and about the axle.

3. The method of claim 1 wherein the axle is configured to be rotatable, the rotation of the axle configured to cause the machining tool to rotate correspondingly therewith.

4. The method of claim 1 wherein the reinforcing member includes a readjustment means.

5. The method of claim 1 wherein the machining tool is selected from the group consisting of a grinding tool, a milling tool, a tuning tool, and a boring tool.

6. The method of claim 1 wherein each of the plurality of cylindrical sections is manufactured from a rolled sheet material.

7. The method of claim 1 wherein the first cylindrical section and the second cylindrical section are shipped to an operating site after the respective formation of the first web and the second web and before the first web is welded to the second web.

8. The method of claim 7 further comprising the step of providing a plurality of mill foundations at the operating site to facilitate the welding of the first web to the second web.

9. The method of claim 8 further comprising the step of providing a support structure between at least two of the plurality of mill foundations for supporting the first cylindrical section.

10. The method of claim 9 wherein the support structure comprises an adjustable bearing.

11. The method of claim 1 wherein the machining tool comprises a mount and a drill.

12. A method of manufacturing a mill cylinder, the mill cylinder comprising a plurality of cylindrical sections, the method comprising steps:
provinding a first cylindrical section and a second cylindrical section, the second cylindrical section having inside and outside diameters substantially equal to inside and outside diameters of the first cylindrical section, the first cylindrical section comprising:
a circumferential surface, an end edge, and a reinforcing member; the reinforcing member including a central disk having an opening; a plurality of radial stays extending from the central disk to the circumferential surface;
temporarily situating the first cylindrical section on an axle that passes through the opening;
operably coupling a machining tool to the axle;
causing the machining tool to rotate such that the machining tool machines an inside face and an outside face of the end edge to form a first web;
machining an inside face and an outside face of the second cylindrical section to form a second web;
abutting the first web with the second web; and
welding the first web to the second web by placing welding material in an interior channel formed by the first and second abutting webs and in an exterior channel formed by the first and second abutting webs.

13. The method of claim 12 wherein the machining tool comprises a first machining tool and a second machining tool for forming respectively the first web and the raceway.

14. The method of claim 12 wherein the axle is fixedly disposed and the machining tool is rotatably coupled to the axle.

15. The method of claim 12 wherein the axle is configured to be rotatable, and the machining tool is rotationally fixed relative to the axle.

16. The method of claim 12 wherein the reinforcing member is configured to be dismantled from the first cylindrical section prior to use of the mill cylinder.

17. The method of claim 12 wherein each radial stay is welded to the circumferential surface proximate the end edge.

18. The method of claim 12 wherein the first cylindrical section and the second cylindrical section are shipped to an operating site after the respective formation of the first web and the second web and before the first web is welded to the second web.

* * * * *